United States Patent
Kechichian et al.

(10) Patent No.: US 9,674,368 B2
(45) Date of Patent: Jun. 6, 2017

(54) METHOD AND APPARATUS FOR AUDIO PROCESSING

(71) Applicant: KONINKLIJKE PHILIPS N.V., Eindhoven (NL)

(72) Inventors: Patrick Kechichian, Eindhoven (NL); Cornelis Pieter Jansen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/765,854

(22) PCT Filed: Mar. 18, 2014

(86) PCT No.: PCT/IB2014/059923
§ 371 (c)(1),
(2) Date: Aug. 5, 2015

(87) PCT Pub. No.: WO2014/147552
PCT Pub. Date: Sep. 25, 2014

(65) Prior Publication Data
US 2015/0381821 A1    Dec. 31, 2015

Related U.S. Application Data

(60) Provisional application No. 61/803,198, filed on Mar. 19, 2013.

(51) Int. Cl.
*H04M 3/00* (2006.01)
*H04M 9/08* (2006.01)

(52) U.S. Cl.
CPC ........... *H04M 9/082* (2013.01); *H04M 3/002* (2013.01)

(58) Field of Classification Search
CPC .............................. H04M 3/002; H04M 9/082
See application file for complete search history.

(56) References Cited

U.S. PATENT DOCUMENTS

| 7,426,270 | B2 | 9/2008 | Alves et al. | |
|---|---|---|---|---|
| 2008/0247536 | A1* | 10/2008 | Rahbar | H04M 9/082 379/406.08 |
| 2011/0093102 | A1 | 4/2011 | Aichner et al. | |

FOREIGN PATENT DOCUMENTS

| EP | 1672803 A2 | 6/2006 |
|---|---|---|
| JP | 2003274481 A | 9/2003 |

(Continued)

OTHER PUBLICATIONS

Stenger et al, "Adaptation of a Memoryless Preprocessor for Nonlinear Acoustic Echo Cancelling", Signal Processing, vol. 80, 2000, p. 1747-1760.

(Continued)

*Primary Examiner* — Sonia Gay

(57) ABSTRACT

An audio apparatus including a circuit for applying a dynamic range adjustment processing to an input signal to generate an output signal for rendering by a loudspeaker. The dynamic range adjustment processing is dependent on a set of dynamic range adjustment parameters. A first linear echo-cancellation filter generates a first compensated signal from the input signal and a first adapter determines a set of filter parameters for the first linear echo-cancellation filter in response to the first compensated signal and a microphone signal. An audio circuit generates a second compensated signal by applying the dynamic range adjustment processing and a second echo-cancellation filter to the input signal where the second echo-cancellation filter corresponding to the first echo-cancellation filter. A second adapter deter- (Continued)

mines the set of dynamic range adjustment parameters in response to the second compensated signal and the microphone signal.

15 Claims, 11 Drawing Sheets

(56) References Cited

FOREIGN PATENT DOCUMENTS

| JP | 2006080686 A | 3/2006 |
|----|--------------|--------|
| WO | 2006071119 A1 | 7/2006 |
| WO | 2012055687 A1 | 5/2012 |

OTHER PUBLICATIONS

Mossi et al, "Non-Linear Acoustic Echo Cancellationusing Online Loudspeaker Linerization", IEEE Workshop on Applications of Signal Processing to Audio and Acoustics, Oct. 16-19, 2011, p. 97-100.

* cited by examiner

METHOD AND APPARATUS FOR AUDIO PROCESSING

CROSS-REFERENCE TO PRIOR APPLICATIONS

This application is the U.S. National Phase application under 35 U.S.C. §371 of International Application No. PCT/IB2014/059923, filed on Mar. 18, 2014, which claims the benefit of U.S. Provisional Application 61/803,198, filed on Mar. 19, 2013. These applications are hereby incorporated by reference herein.

FIELD OF THE INVENTION

The invention relates to an audio apparatus and an audio processing method and in particular, but not exclusively, to echo-cancellation for acoustic echoes.

BACKGROUND OF THE INVENTION

Many audio applications use both an audio transducer, such as a loudspeaker, as well as a microphone in the same audio environment. For example, telephone or teleconferencing applications typically employ speakers and microphones in close proximity.

However, acoustic coupling between the loudspeaker and the microphone causes the microphone signal to include elements of the sound rendered from the loudspeaker which is often disadvantageous.

For example, for telephone and teleconference devices, the acoustic coupling between the device's loudspeaker and microphone causes a portion of the produced loudspeaker signal to be captured by the microphone and transmitted back to the far-end user resulting in a disturbance known as an acoustic echo. It is usually assumed that this echo path can be sufficiently modeled using a linear filter since the microphone picks up reflections of the loudspeaker signal with different delays and intensities, depending on the acoustic environment where the device is being used. Therefore, linear echo cancellers are widely used to reduce the acoustic echo.

In practice, however, and depending on the device, components in the acoustic echo path also include the audio amplifier and loudspeaker which often exhibit nonlinear characteristics. Therefore, purely linear echo cancellation tends to be suboptimal and tends to not be able to completely remove the acoustic echo.

The primary causes of nonlinearities in loudspeakers are the non-uniform magnetic flux density and nonlinear suspension system. The latter mainly contributes to distortion at low frequencies, while the former is exacerbated by high-amplitude signals. In effect, large cone excursions, particularly those outside of the loudspeaker's linear operating range, result in nonlinear distortions.

In more detail, the behavior of a loudspeaker system may be considered for different frequency ranges of an input signal. For frequencies above the resonance frequency, the loudspeaker can be characterized by its voice coil's resistance and inductance. Therefore, as the input power to the voice coil increases and the excursions become large enough for the coil to fall outside of the magnetic field, the driving force decreases, resulting in a form of compression or clipping effect.

For low frequencies, the loudspeaker is predominantly characterized by its moving system impedance which is proportional to the power of the magnetic flux. This means that as the voice coil moves outside of the magnetic field, this impedance decreases and therefore instead of clipping, the amplitude of the current in the voice coil actually increases before the loudspeaker's suspension system limits the excursion.

Proper modeling of the nonlinear behavior of loudspeakers remains a challenging topic in the field of acoustic echo cancellation. This is especially true for hands-free communication applications where low-cost audio components such as amplifiers and loudspeakers are used. These components are often driven into their nonlinear range of operation in order to achieve a high sound output level required for such applications. The resulting nonlinear distortion not only limits the performance of acoustic echo cancellers, which usually assume a linear impulse response between the loudspeaker and microphone, but also affects the perceived quality of the loudspeaker signal.

Therefore, systems for managing nonlinear acoustic echo play a significant role in improving the audio quality for two-way communication systems.

In the prior art, three main classes of systems exist for cancelling or suppressing nonlinear acoustic echoes:
1. Nonlinear acoustic echo cancellation.
2. Loudspeaker linearization for linear acoustic echo cancellation.
3. Nonlinear acoustic echo suppression.

In the first type of system, the acoustic echo path nonlinearity is modeled by the acoustic echo canceller. For example, saturation of the audio amplifier can be modeled using a clipping function with a clipping level that matches that of the audio amplifier. If this clipping function is applied to the digital loudspeaker signal, then a standard linear acoustic echo canceller can be used to model the linear acoustic path between the loudspeaker and microphone. As mentioned previously, the loudspeaker is also a source of nonlinearities. Unlike a clipping function which is memoryless, loudspeaker nonlinearities usually contain some form of memory, and are most commonly modeled by a Volterra series expansion which is computationally quite expensive. While low-cost versions of Volterra based algorithms exist, such as the power series expansion, these often still require signal orthogonalization methods which can still be computationally intensive.

A major drawback of the first type of system is that they are required to closely match the model to that of the underlying physical system. This typically cannot be achieved with a high degree of accuracy. Furthermore, they tend to be computationally very intensive.

The second type of system applies a non-linear function to the loudspeaker signal so that the concatenation of this function with that of the loudspeaker's response approximates a linear function, and thus the loudspeaker signal captured by the device's microphone is approximately a linear function of the loudspeaker signal. Accordingly, standard linear adaptive filters can be used to model this linear function and perform acoustic echo cancellation.

A drawback of such an approach is that it can only approximately linearize the loudspeaker's output signal and the performance usually degrades when amplifier saturation also occurs since such a transformation is not easy to linearize.

The third type of system is often used as a post-processing step to acoustic echo cancellation, where residual nonlinear acoustic echoes which could not be suppressed in the echo cancellation stage are suppressed. Usually this suppression is performed in the spectral amplitude domain using a spectral model of echo nonlinearity.

The main drawback of this approach is that due to over-suppression and lack of echo phase information in the spectral amplitude-domain, near-end audio (and specifically speech) originating from the local environment can be severely attenuated which may result in making e.g. full duplex communication with the far-end party difficult.

In general, prior art approaches to echo-cancellation tend to be complex, result in sub-optimal performance and/or high computational resource usage.

Hence, an improved approach would be advantageous and in particular an approach allowing increased flexibility, reduced complexity, facilitated implementation, reduced resource usage and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an audio apparatus comprising: a circuit for applying a dynamic range adjustment processing to an input signal to generate an output signal for rendering by a loudspeaker, the dynamic range adjustment processing being dependent on a set of dynamic range adjustment parameters; a first linear echo-cancellation filter for generating a first compensated signal from the audio input signal; a first adapter for determining a set of filter parameters for the first linear echo-cancellation filter in response to the first compensated signal and a microphone signal; a circuit for generating a second compensated signal by applying the dynamic range adjustment processing and a second echo-cancellation filter to the input signal, the second echo-cancellation filter corresponding to the first echo-cancellation filter; a second adapter for determining the set of dynamic range adjustment parameters in response to the second compensated signal and the microphone signal.

The approach may provide an improved linearization of operation of a rendering system experiencing acoustic feedback or echoes. The invention may mitigate the impact of non-linearities in e.g. a sound transducer driver (e.g. an amplifier) and/or a sound transducer (e.g. a loudspeaker).

The invention may provide improved performance in many embodiments. In particular, improved echo cancellation may be achieved in many applications.

A particular advantage is that improvements can be achieved for a large variety of acoustic echoes and rendering systems without requiring specific knowledge or modeling of the rendering system (such as specifically without requiring assumptions or modeling of power amplifiers or audio transducer characteristics). In many embodiments, the apparatus may automatically adapt to the specific characteristics of the individual rendering system. For example, the invention may allow a system which provides improved linearization without requiring any knowledge of the non-linearity characteristics of the power amplifier or loudspeaker used in the system.

Another advantage is that the approach may compensate for e.g. age-related changes in components in the audio chain over time or e.g. changes related to the audio amplifier's power supply, which for battery-powered devices also changes over time between recharges.

The specific structure may allow a system which automatically adapts towards an operating point that provides a desired linearization without unduly restricting the dynamic range of the output signal. In particular, the use of first and second compensated signals generated in accordance with the invention may provide efficient and advantageous adaptation of both the first echo cancellation filter and the dynamic range adjustment processing. The interaction of the echo cancellation and the dynamic range adjustment processing in the adaptations may provide a system that for different scenarios biases the adaptation of the dynamic range adjustment processing in different directions. This may result in an improved adaptation as the operating point may be driven towards an optimum from different directions.

For example, in many embodiments and scenarios, the dynamic range adjustment parameters will adapt towards increased dynamic range restriction when non-linearities are too high, and towards reduced dynamic range restriction when the non-linearities are too low.

The apparatus utilizes adaptation loops. For example, the first compensated signal is generated from the first echo cancellation filter which is adapted based on the first compensated signal. Similarly, the second compensated signal may be generated from applying the dynamic range adjustment processing (and the echo cancellation) to the input signal with the dynamic range adjustment processing being adapted based on the second compensated signal. The properties of such feedback loops may be set to provide desired loop parameters, such as specifically desired dynamic parameters. In many scenarios, a sampled system may be used wherein the adaptation (e.g. the dynamic range adjustment parameters and/or first set of parameters) for one sample is based on compensated signal values of one or more previous samples.

The first adapter may specifically generate update values for parameters of the set of filter parameters. The second adapter may specifically generate update values for parameters of the set of dynamic range adjustment parameters.

The second echo-cancellation filter may specifically correspond to the first echo-cancellation filter by being determined by the same parameters, i.e. by the first set of parameters. In some embodiments, there may be a time offset in adaptation of the first echo-cancellation filter and the second echo-cancellation filter. For example, for a given signal sample, the first set of parameters used for the first echo-cancellation filter may be generated for a previous signal sample whereas the first set of parameters used for the second echo-cancellation filter may be those determined for the current signal sample. In some embodiments, the filter parameters for the second echo-cancellation filter may correspond to the filter parameters used for the first echo-cancellation filter when combined with the update values determined by the first adapter.

The dynamic range adjustment processing may be arranged to restrict the dynamic range of the input signal.

In accordance with an optional feature of the invention, the dynamic range adjustment processing is a non-linear dynamic range adjustment processing.

In some embodiments, the dynamic range adjustment processing may be a linear dynamic range adjustment, such as e.g. using a variable gain which is dependent on the dynamic range adjustment parameters.

However, in many embodiments, the dynamic range adjustment processing may advantageously be a non-linear dynamic range adjustment processing. This may provide improved performance, and may in particular allow improved sound levels for a given power amplifier or loudspeaker.

In accordance with an optional feature of the invention, the audio apparatus further comprises a variable gain arranged to scale the input signal in response to a signal level measure of the input signal and at least one parameter of the set of dynamic range adjustment parameters.

This may provide improved performance in many embodiments. In particular, the combination of a variable gain and non-linear dynamic range adjustment processing may provide an improved trade-off between different characteristics, such as between sound level and distortion.

In accordance with an optional feature of the invention, the at least one parameter is a clipping level parameter.

This may provide improved performance in many embodiments. In particular, the combination of a variable gain and a clipping dynamic range adjustment processing may provide an improved trade-off between different characteristics, such as between sound level and distortion.

The clipping may be a soft or hard clipping.

In accordance with an optional feature of the invention, the non-linear dynamic range adjustment processing comprises signal clipping.

This may provide improved performance in many embodiments. In particular, a clipping dynamic range adjustment processing may provide an improved trade-off between different characteristics such as sound level and distortion.

In accordance with an optional feature of the invention, the signal clipping is a hard clipping.

This may allow low complexity and/or improved performance in many situations and embodiments.

In accordance with an optional feature of the invention, the audio apparatus further comprises an echo canceller arranged to perform echo cancellation on the microphone signal based on the output signal.

A combination of the approach of generating the output signal together with a separate echo canceller may provide particularly advantageous performance. In particular, improved linearization may allow improved echo cancellation by the echo canceller.

The approach may furthermore allow the echo-canceller to be developed independently of the functions that apply and adapt the dynamic range adjustment processing, and vice versa. This may facilitate implementation, and may in particular allow facilitated introduction of e.g. the pre-processing to existing echo-cancelling systems.

In accordance with an optional feature of the invention, the echo canceller is a linear echo-canceller.

The invention may allow particularly improved performance of a linear echo cancelling.

In accordance with an optional feature of the invention, the echo canceller is independent of the first compensated signal, the second compensated signal and the input signal.

The echo canceller may in some embodiments be based on no other signals than the output signal and the microphone signal.

In accordance with an optional feature of the invention, the first adapter is arranged to generate a difference signal between the first compensated signal and the microphone signal, and to modify the set of filter parameters to reduce the difference signal.

This may provide particularly advantageous operation and/or performance and may in many embodiments facilitate implementation.

In accordance with an optional feature of the invention, the second adapter is arranged to generate a difference signal between the second compensated signal and the microphone signal, and to modify the set of dynamic range adjustment parameters to reduce the difference signal.

This may provide particularly advantageous operation and/or performance and may in many embodiments facilitate implementation.

In accordance with an optional feature of the invention, the dynamic range adjustment parameters define a function relating values of the input signal to values of the output signal.

This may provide particularly advantageous operation and/or performance, and may in many embodiments facilitate implementation.

According to an aspect of the invention there is provided an audio processing method comprising: applying a dynamic range adjustment processing to an input signal to generate an output signal for rendering by a loudspeaker, the non-linear processing being dependent on a set of dynamic range adjustment parameters; generating a first compensated signal from the audio input signal by a first linear echo-cancellation filter; determining a set of filter parameters for the first linear echo-cancellation filter in response to the first compensated signal and a microphone signal; generating a second compensated signal by applying the dynamic range adjustment processing and a second echo-cancellation filter to the input signal, the second echo-cancellation filter corresponding to the first echo-cancellation filter; and determining the set of dynamic range adjustment parameters in response to the second compensated signal and the microphone signal.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to an echo cancelling system for a telecommunication system. However, it will be appreciated that the invention is not limited to this application but may be applied to many other systems and applications.

Figure 1:
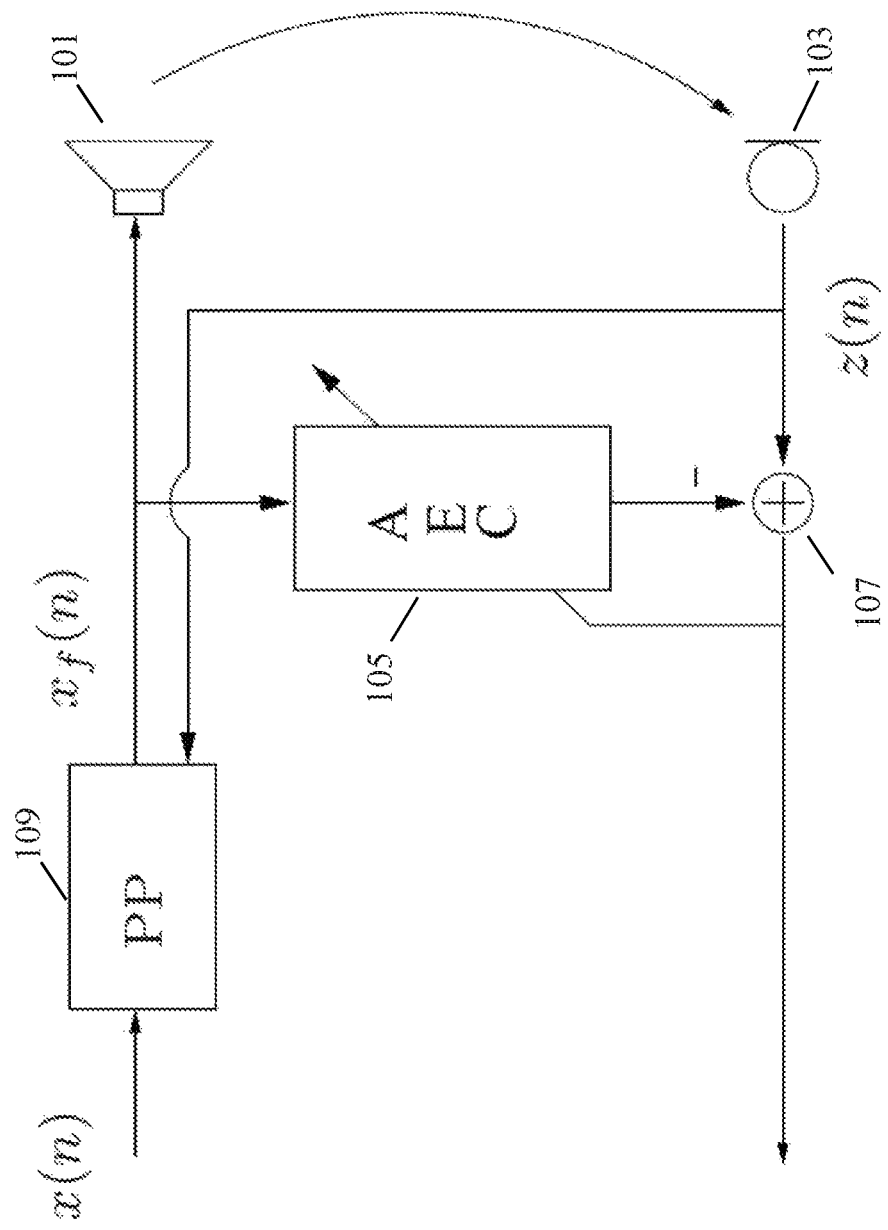
FIG. 1 illustrates an example of an audio apparatus in accordance with some embodiments of the invention.

FIG. 1 illustrates an example of an audio apparatus in accordance with some embodiments of the invention. In the specific example, the audio apparatus is an echo cancelling system.

The system comprises a loudspeaker 101 which renders audio in an acoustic environment. A microphone 103 records audio from the acoustic environment in order to produce a signal reflecting audio from a local source in the audio environment. Specifically, the system may be used as part of a telecommunication system wherein the loudspeaker 101 is used to render audio from a remote source and the microphone 103 is used to pick up local audio which is transmitted to the far end. However, a problem in such set-ups is that the microphone 103 will typically also pick up audio from the loudspeaker 101 resulting in an echo being set back to the far end unless echo cancellation is performed.

Accordingly, the system also includes an echo canceller 105 which is coupled to the loudspeaker 101 and which receives the drive signal for the loudspeaker 101. The echo canceller 105 generates an echo cancellation signal which is coupled to a subtractor 107 which is further coupled to the microphone 103 and which receives the microphone signal therefrom. The subtractor 107 can be perceived as part of the echo canceller or as a separate entity.

The echo cancellation signal provides an estimate of the signal component of the microphone signal which is caused by audio from the loudspeaker 101. The output of the subtractor 107 is the microphone signal minus the echo cancellation signal, and thus ideally corresponds to the microphone signal with the acoustic echo removed. The output of the subtractor 107 accordingly generates an echo cancelled signal which can be transmitted to the far end.

The echo canceller 105 is an adaptive echo canceller which adjusts its operation based on the output of the subtractor 107. Thus, the output signal from the subtractor 107 is also fed to the echo canceller 105 where it is used to adapt the estimation of the echo canceller 105. Typically, the echo canceller 105 implements an adaptive filter which estimates the transfer function from the input to the loudspeaker 101 to the microphone input of the subtractor 107. The adaptive filter is adapted based on the echo cancelled signal, and typically the adaptation seeks to minimize the signal level of the echo cancelled signal.

It will be appreciated that a large number of echo cancellation algorithms and adaptation algorithms will be known to the skilled person and that any suitable approach can be used without detracting from the invention. For example, a Least Mean Squares (LMS) approach may be used to adapt the coefficients of a linear adaptive filter.

It will be appreciated that FIG. 1 for clarity and brevity discloses a simplified system representation. For example, most practical systems will include an amplifier, an audio transducer, filters etc. The loudspeaker 101 of FIG. 1 may be considered to reflect the entire rendering signal path from the input to the echo canceller 105 to the rendering of audio, and thus may specifically include the characteristics of the power amplifier, the audio transducer etc.

Similarly, the output from a microphone will typically be filtered and amplified, and the microphone 103 of FIG. 1 may be considered to represent all parts of the signal path from the audio being captured to the signal being fed to the subtractor 107, i.e. it may be considered to include microphone amplifiers, filters etc.

Thus, effectively the echo canceller 105 seeks to compensate for the acoustic echo by estimating the entire signal path from the input to the echo canceller 105 (referenced as $x_f(n)$) to the input to the subtractor 107 (referenced z(n)).

However, a particular challenge for such systems is that echo cancellers tend to require the path to be substantially linear in order to provide efficient echo cancelling. Specifically, most practical high performance adaptive echo cancellers tend to be linear echo cancellers and are as such only able to compensate for linear signal effects. However, many practical rendering components tend to have non-linear effects, especially when they are used intensively.

For example, in order to maximize the sound pressure levels, loudspeakers and power amplifiers are frequently used towards their non-linear operation ranges. Therefore, non-linear effects may often occur in practical implementations and this will typically result in the echo cancelling being inefficient.

In the system of FIG. 1 improved performance is achieved by the presence of a pre-processor 109 which is arranged to process the signal to be rendered prior to this being fed to the loudspeaker 101.

The pre-processor 109 is arranged to perform a dynamic range adjustment for the input signal resulting in the loudspeaker 101 (i.e. typically the path of a power amplifier and audio transducer) being operated more linearly. This may provide improved performance and may specifically allow the echo canceller 105 to operate more efficiently and provide an improved echo cancellation. The pre-processor 109 is arranged to adapt the dynamic range adjustment and is accordingly fed the microphone signal. It will be appreciated that the pre-processor 109 can also be fed the output of the acoustic echo canceller 105 and the output of the subtractor 107, since the sum of these signals also equals the microphone signal. However, in the specific example pre-processor 109 is fed the microphone signal since access to the output of the acoustic echo canceller 105 and output of the subtractor 107 is not always available.

Thus, in the system an input signal x(n) is provided to the pre-processor 109 which proceeds to generate an output signal which is henceforth referred to as a drive signal $x_f(n)$. The drive signal is rendered and in the example of FIG. 1 is shown to be rendered from a loudspeaker 101. It will be appreciated that in many embodiments, the output of the pre-processor 109 (i.e. the drive signal) is not directly fed to an audio transducer but rather is submitted to various audio processing functions including power amplification, filtering, digital-to-analog conversion etc. Thus, in the following references to the loudspeaker 101 may be considered to include all elements of the signal path from the output of the pre-processor 109 to the rendered audio.

The microphone 103 captures a microphone signal z(n) which reflects the audio in the acoustic environment. It will be appreciated that the microphone signal z(n) which is being echo cancelled is typically not the one directly provided by a given microphone unit but will typically first be amplified, filtered, sampled etc. Thus, in the following references to the microphone 103 may be considered to include all elements of the signal path from the audio of the acoustic environment to the signal that is fed to the pre-processor 109.

Thus, in the system of FIG. 1, the pre-processor 109 receives an input signal x(n) which is intended for rendering by the loudspeaker 101. It furthermore receives an input signal captured by the microphone 103. The pre-processor 109 proceeds to generate a drive signal $x_f(n)$ which is rendered by the loudspeaker 101. The rendered audio reaches the microphone 103 via an acoustic path that has a given acoustic impulse response (and corresponding acoustic transfer function). The microphone signal z(n) fed to the pre-processor 109 thus corresponds to the generated drive signal $x_f(n)$ modified by the signal path comprising the loudspeaker 101, the acoustic path from the loudspeaker 101 to the microphone 103, and the microphone 103, i.e. it is modified by the combined effect of the characteristics of the loudspeaker 101, the acoustic path, and the microphone 103.

Similarly, the echo canceller 105 performs echo cancellation on the microphone signal z(n) based on the drive signal $x_f(n)$ and thus seeks to estimate or model the combined effects of the loudspeaker 101, the acoustic path from the loudspeaker 101 to the microphone 103, and the microphone 103.

The pre-processor 109 is arranged to perform dynamic range adjustment for the input signal x(n) such that the loudspeaker 101 (including in particular a power amplifier and audio transducer) exhibits more linear characteristics, and in many embodiments exhibits substantially linear characteristics.

The pre-processor 109 uses a specific structure and approach which allows it to automatically adapt the dynamic range processing towards an optimal operating point. Furthermore, the adaptation does not require any knowledge or assumptions about the specific characteristics of the transfer function from the drive signal $x_f(n)$ to the microphone signal z(n). Rather, the pre-processor 109 may automatically adapt the dynamic range processing to the specific characteristics of the loudspeaker 101 (including the associated power amplifier etc.).

Figure 2:
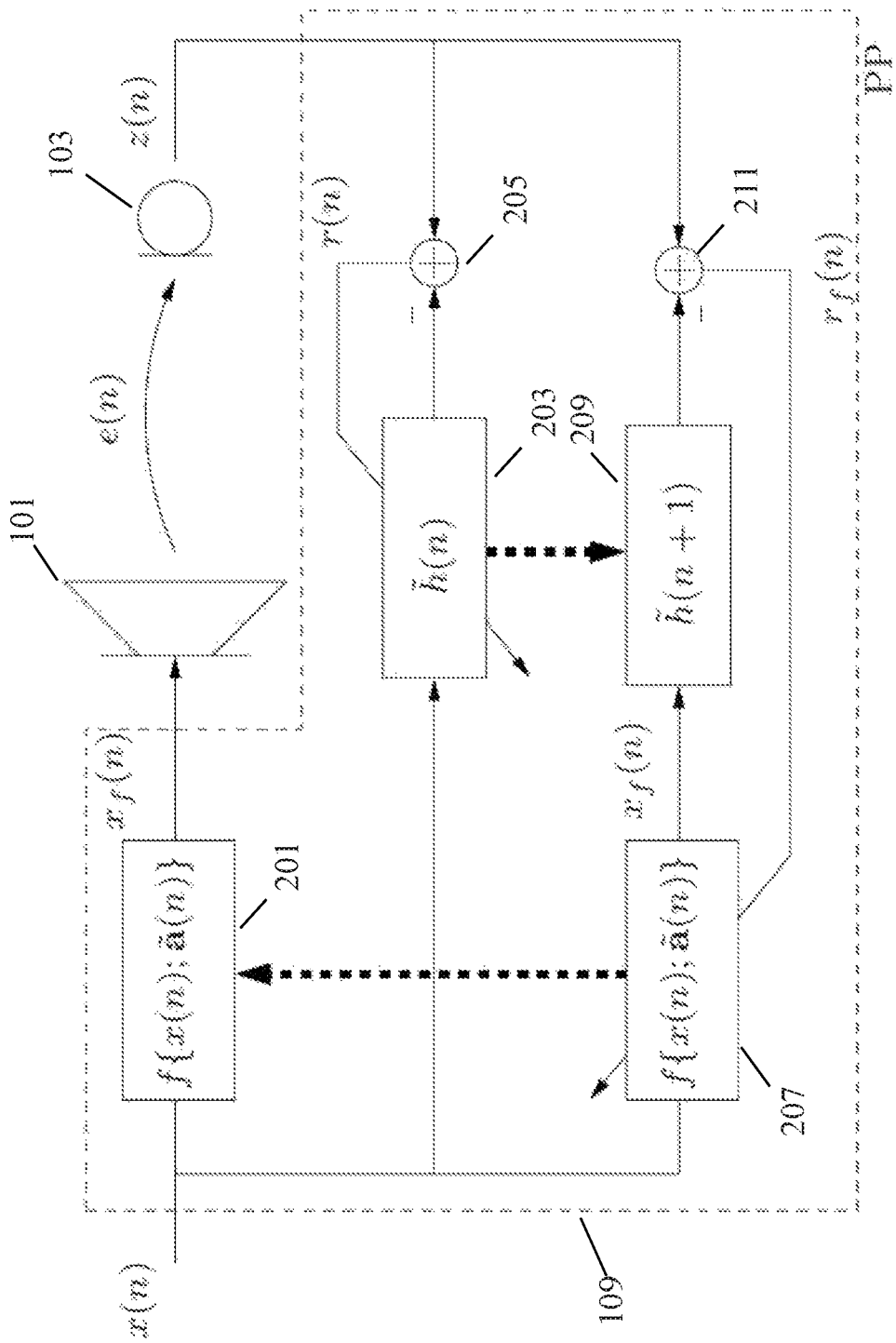
FIG. 2 illustrates an example of an audio apparatus in accordance with some embodiments of the invention.

FIG. 2 illustrates the pre-processor 109 in more detail. As illustrated the pre-processor 109 comprises three parallel branches or paths. In one path (the uppermost path of FIG. 2), a dynamic range processor 201 applies a dynamic range adjustment denoted $f\{x(n);ã(n)\}$ to the input signal x(n) to generate the drive signal $x_f(n)$. This signal is then rendered by the loudspeaker 101. The loudspeaker 101 renders the sound with characteristics that can be represented by a function $F\{x_f(n)\}$ which may typically be a non-linear function, at least for some signal levels. Thus, the function $F\{x_f(n)\}$ represents the combined effects of the audio transducer, power amplifier etc. and may specifically reflect e.g. the clipping behavior of the power amplifier and the non-linearities of the audio transducer.

The dynamic range processor 201 applies a dynamic range adjustment processing to the input signal thereby generating the drive signal $x_f(n)$ (the pre-processor 109 output signal) which is then rendered by the loudspeaker 101. The dynamic range adjustment processing is an adaptive dynamic range adjustment processing which is dependent on a set of dynamic range adjustment parameters.

The dynamic range adjustment processing may specifically apply a function which relates the current input signal value to an output signal value. For example, for each value of the input signal x(n), the dynamic range adjustment processing may set the value of the drive signal $x_f(n)$ as determined by an adaptable function. Thus, an adaptable function defines the relationship between input signal values and output signal values for the dynamic range processor 201. The adaptable function is defined by a set of parameters, referred to as the dynamic range adjustment parameters. These parameters may thus determine the specific dynamic range adjustment processing that is currently applied.

Thus, the dynamic range processor 201 may apply the operation:

$$x_f(n)=f\{x(n);ã(n)\}$$

where the dynamic range adjustment parameters ã(n) define the relationship between the signal values and the output values.

FIGS. 3 to 6 illustrate specific examples of functions that may be applied.

Figure 3:
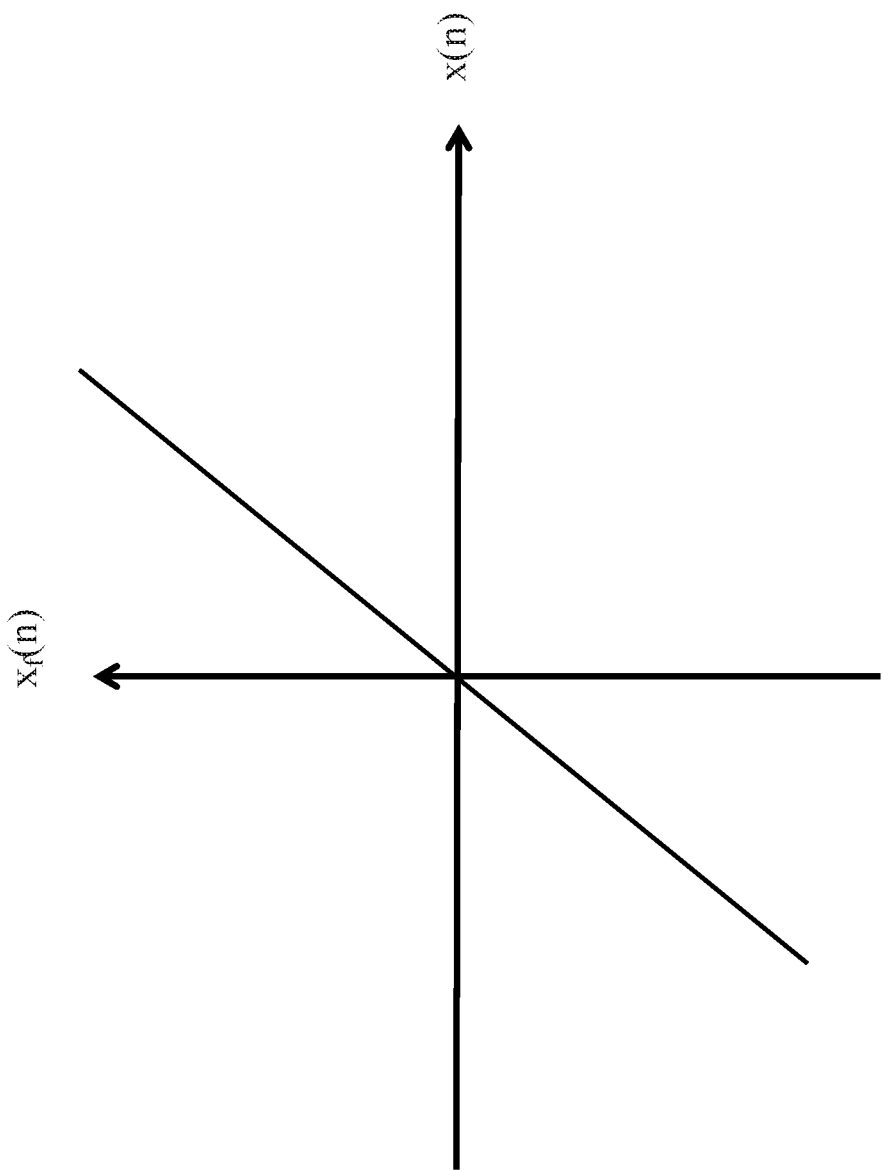
FIGS. 3-6 illustrate different functions for dynamic range adjustment processing for the audio apparatus of FIG. 1 or 2.

In the example of FIG. 3, a linear dynamic range adjustment processing is applied where there is a linear relationship between the input signal values x(n) and the drive signal values $x_f(n)$. In this example, the dynamic range adjustment parameters may consist in e.g. a single scalar value which defines the gradient of the function. Thus, for any value below one, the dynamic range adjustment processing will reduce the dynamic range and for a value of one the original signal will be passed unchanged.

Figure 4:
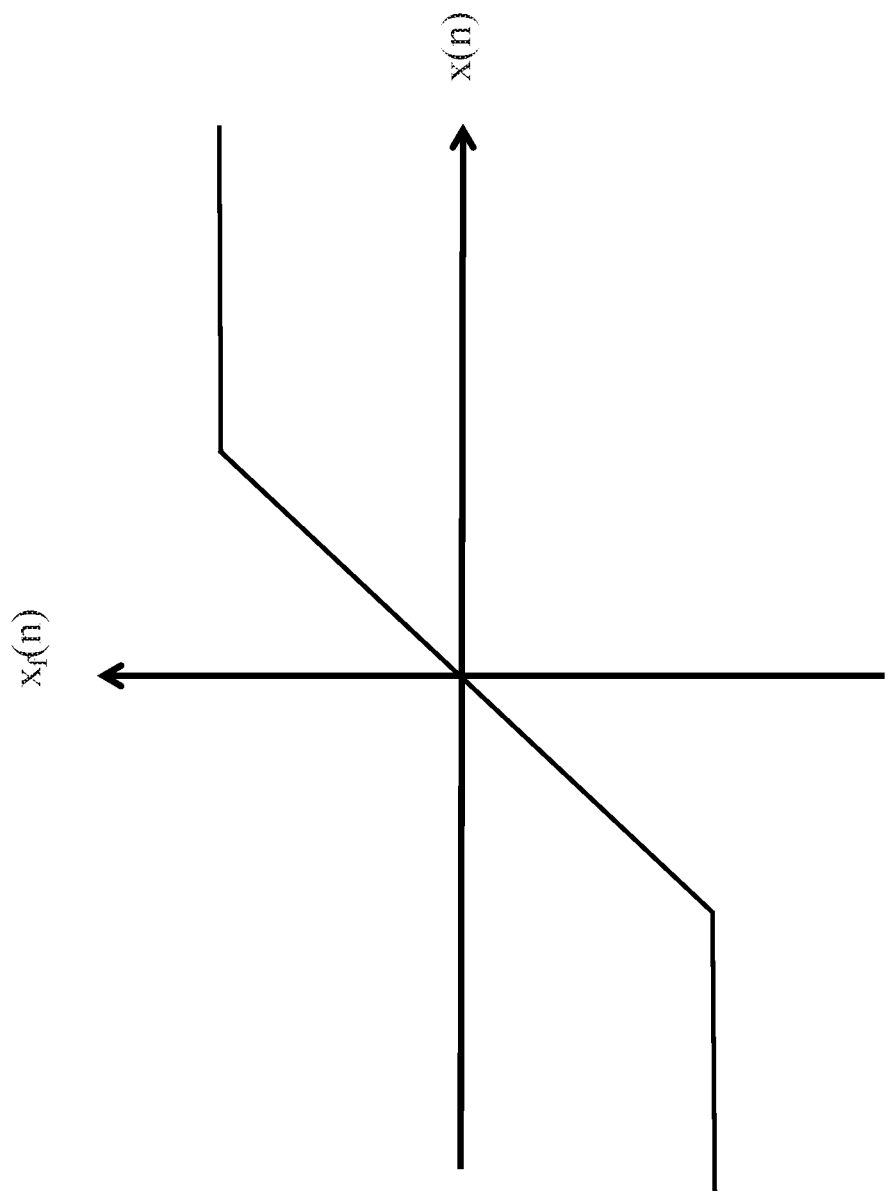

In the example of FIG. 4, a linear dynamic range adjustment processing is applied where there is a linear relationship between the input signal values x(n) and the drive signal values $x_f(n)$ for a limited range of input signal values x(n) (and accordingly drive signal values $x_f(n)$). However, if the (absolute value of the) input signal values x(n) exceed a given threshold, the (absolute value of the) drive signal values $x_f(n)$ are kept constant. Thus, the dynamic range processor 201 in this example performs a hard clipping. In the example, the dynamic range adjustment processing is linear as long as the signal levels are sufficiently low. Thus, as long as the signal levels are sufficiently low, the dynamic range processor 201 does not introduce any distortion. However, for higher values, clipping may be introduced to restrict the dynamic range.

In the example, the dynamic range adjustment parameters may comprise a set of values defining the current clipping levels (which may be symmetric or asymmetric) as well as possibly a gradient for the linear region.

Figure 5:
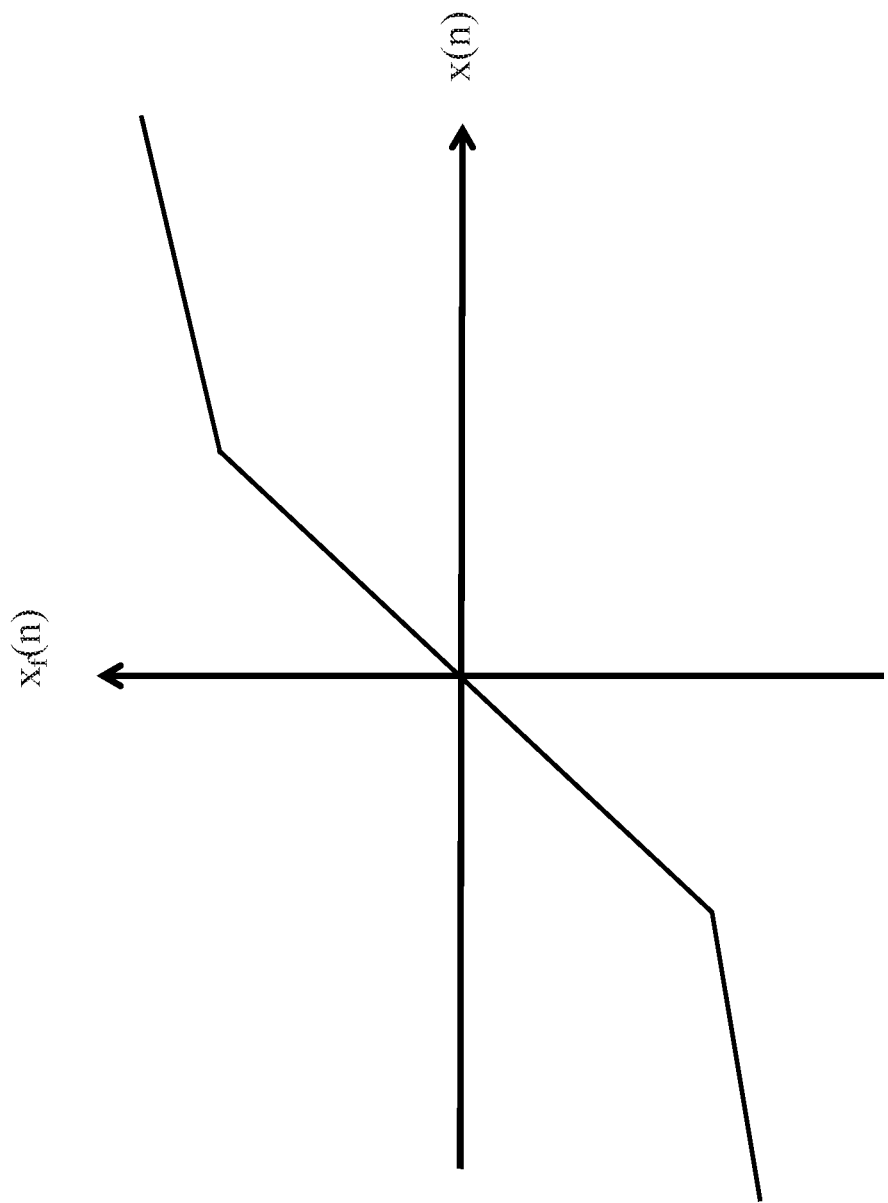

In some embodiments, the clipping may be soft clipping for example as illustrated in FIG. 5 wherein the function is defined by three linear sections with different gradients. In such an example, the dynamic range adjustment parameters may define the gradients for the three linear sections as well as the transition points between these.

Figure 6:
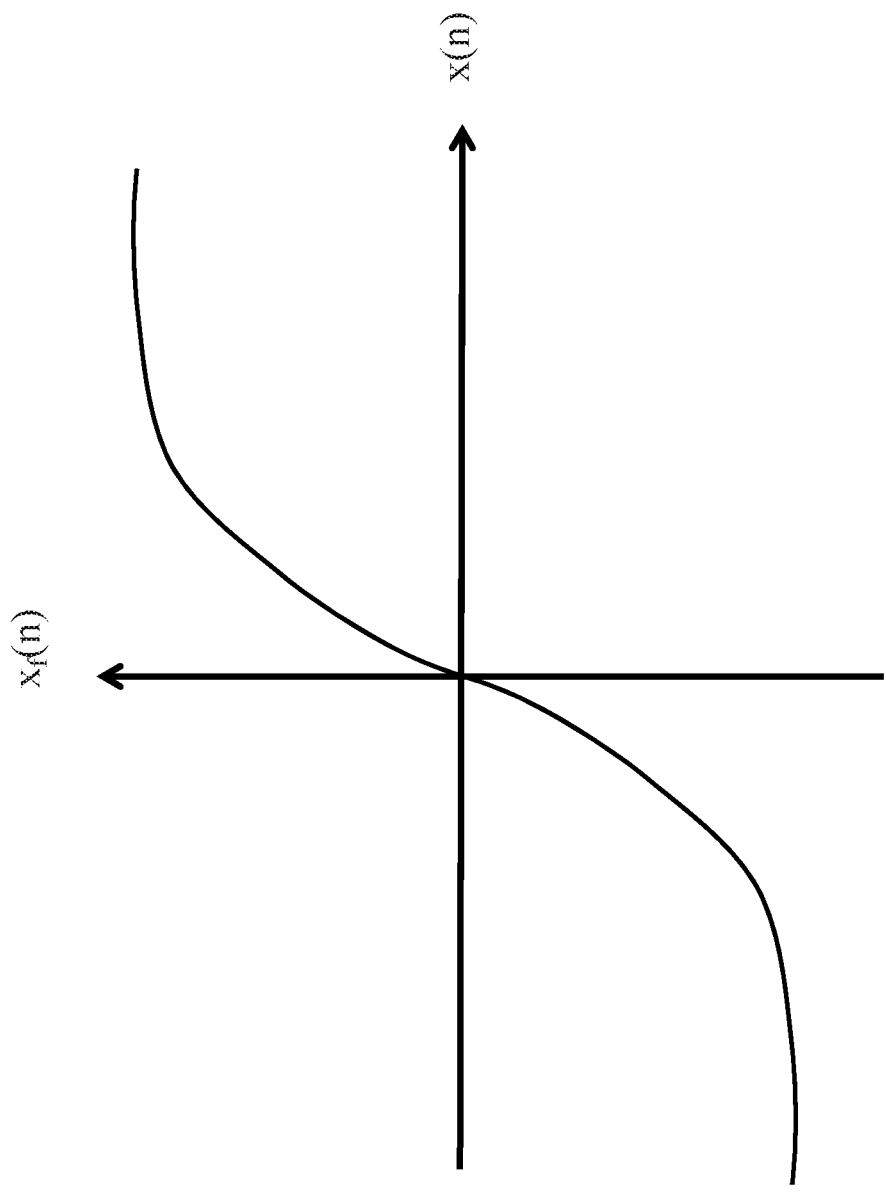

It will be appreciated that any suitable function may be used and that the dynamic range adjustment parameters may define any suitable function, such as e.g. a function as illustrated in FIG. 6. It will also be appreciated that any suitable way of representing a function by a set of parameters may be used, including e.g. a sampled representation. For example, for each possible sample value of the input signal x(n), a parameter of the set of dynamic range adjustment parameters may define a signal value of the drive signal $x_f(n)$. As another example, the function may be given as a polynomial function where the dynamic range adjustment parameters define the value of each coefficient.

The pre-processor 109 furthermore comprises a second path (the middle path of FIG. 2) which comprises a linear echo-cancellation filter 203 which is coupled to the input of the pre-processor 109 and which receives the input signal x(n). The linear echo-cancellation filter 203 filters the input signal and generates a first compensated signal. This signal is coupled to a first adapter which in FIG. 2 is shown as a first difference unit 205 which in the specific example is a subtractor. The first difference unit 205 also receives the microphone signal z(n) and it proceeds to generate a first difference signal r(n) indicative of the difference between the first compensated signal and the microphone signal. In the specific example, the first compensated signal is simply subtracted from the microphone signal z(n).

The resulting first difference signal r(n) is thus indicative of the captured audio after the estimated linear echo from the input signal x(n) to the microphone signal z(n) has been removed. The first difference signal r(n) is used to adapt the linear echo-cancellation filter 203. Specifically, the linear echo-cancellation filter 203 may be adapted to minimize the signal energy of the first difference signal r(n).

Thus, the second path operates a linear echo cancellation between the input signal x(n) and the microphone signal z(n). The path may use a conventional linear echo cancellation technique, and the linear echo-cancellation filter 203 may be adapted in accordance with any suitable echo cancellation algorithm, including for example an LMS adaptation algorithm.

In addition, the pre-processor 109 comprises a third path (the lower path of FIG. 2) which generates a second compensated signal by applying the dynamic range adjustment processing and a second echo-cancellation filter to the input signal.

In the example of FIG. 2, the second path includes a supplementary dynamic range processor 207 which performs the same operation as the dynamic range processor 201. The supplementary dynamic range processor 207 is coupled to the input and receives the input signal x(n) and generates a copy of the drive signal $x_f(n)$. The copy of the drive signal $x_f(n)$ is fed to a second echo-cancellation filter 209 which corresponds to the linear echo-cancellation filter 203 and which generates the second compensated signal. Thus, the second compensated signal corresponds to the signal that results from applying the echo cancellation of the linear echo-cancellation filter 203 to the drive signal $x_f(n)$ rather than to the input signal x(n) (as for the second path).

The resulting second compensated signal is fed to a second adapter in the form of a second difference unit 211 which in the specific example is a subtractor. The second difference unit 211 also receives the microphone signal z(n) and it proceeds to generate a second difference signal $r_f(n)$ indicative of the difference between the second compensated signal and the microphone signal. In the specific example, the second compensated signal is simply subtracted from the microphone signal z(n).

The second difference signal $r_f(n)$ is used to adapt the supplementary dynamic range processor 207 and the dynamic range processor 201. Specifically, the supplementary dynamic range processor 207 and the dynamic range processor 201 may be adapted to minimize the signal energy of the second difference signal $r_f(n)$.

Thus, the second path operates a linear echo cancellation between the drive signal $x_f(n)$ and the microphone signal z(n) using the echo cancellation filter that was determined for the second path, i.e. the echo cancellation filter resulting from a linear echo cancellation between the drive signal $x_f(n)$ and the microphone signal z(n). The resulting residual signal is however not used to update the echo-cancellation filter but is used to adapt the dynamic range adjustment parameters of the supplementary dynamic range processor 207 and the dynamic range processor 201.

Thus, specifically, the second difference signal $r_f(n)$ is used to modify the dynamic range adjustment parameters such that a reduced second difference signal $r_f(n)$ is achieved.

It is noted that the dynamic range adjustment parameters used for the supplementary dynamic range processor 207 and the dynamic range processor 201 correspond to each other, and indeed in many embodiments only a single dynamic range processor may be used. For example, the second echo-cancellation filter 209 may receive the drive signal $x_f(n)$ directly from the dynamic range processor 201, and likewise the adaptation may be directly of the dynamic range processor 201.

It will be appreciated that any suitable adaptation algorithm may be used for adapting the dynamic range adjustment parameters based on the second difference signal $r_f(n)$. For example, as will be described in more detail in the following an LMS algorithm may be applied.

In the example of FIG. 2, the linear echo-cancellation filter 203 and the second echo-cancellation filter 209 correspond to each by the second echo-cancellation filter 209 being defined by filter parameters determined for the linear echo-cancellation filter 203, i.e. the set of filter parameters defining the second echo-cancellation filter 209 are selected as a set of filter parameters determined for the linear echo-cancellation filter 203 by the adaptation/echo cancellation. However, at any given instant the linear echo-cancellation filter 203 and second echo-cancellation filter 209 need not be identical. In particular, there may be a relative time offset between the filters and filter parameters used for the two filters. E.g. in FIG. 2, the linear echo-cancellation filter 203 is given by filter parameters defining a function $\tilde{h}(n)$ while at the same time the second echo-cancellation filter 209 is by filter parameters defining function $\tilde{h}(n+1)$, i.e. the filter parameters for the second echo-cancellation filter 209 include the update values that were determined for sample n.

The structure and approach of the pre-processor 109 provides for a particularly efficient operation that may result in improved operation of the system of FIG. 1. In particular, it may allow the system to operate at an operating point where the sound rendering is more linear, and specifically may reduce the risk of a power amplifier or audio transducer operating in the non-linear area. This may substantially improve the linear echo cancelling of the echo canceller 105.

Furthermore, the specific arrangement and interaction of the different paths of the pre-processor 109 result in a system wherein two adaptations interact while being relatively independent. Specifically, the combination of the operation of the paths and the adaptations provides a system that will not only reduce the dynamic range if this is too large but will also increase it if it is too low. Specifically, as the amplitude of the drive signal $x_f(n)$ is reduced the linearity of the rendering will not reduce but rather will typically increase, i.e. the lower the dynamic range the more linear the rendering will typically be. Therefore, a conventional approach seeking to reduce the non-linearity of the rendering will simply tend to reduce the signal level towards zero. However, this is of course undesirable as it will result in no sound being rendered. In contrast, in the system of FIG. 1 when the rendering of the audio is linear, the pre-processor 109 will instead seek to increase the residual signal, i.e. it will seek to increase the non-linearity. Thus, the pre-processor 109 will automatically adapt the dynamic range adjustment processing towards increased dynamic range when the audio rendering is linear but will adapt it towards a reduced dynamic range when the audio rendering is non-linear. Thus, a bias towards an optimum operating point is achieved.

This effect, and indeed the operation of the system of FIG. 1 and the pre-processor 109 of FIG. 2 will in the following be described in more mathematical detail. In the example, the effect of the loudspeaker 101/rendering path (including in particular the combined effect of the power amplifier and audio transducer) is represented by the non-linear function $F\{x_f(n)\}$. The resulting echo signal is denoted e(n) and is captured by the microphone 103. In addition to the echo, the microphone also picks up disturbances from the local environment such as stationary background noise and near-end speech, but in order to simplify the following analysis and description, these signal components are not considered further. However, to reflect the presence of such components, the microphone signal is denoted by z(n).

Assuming that the LMS algorithm is employed, the update equation for $\tilde{h}(n)$ is given by $$\tilde{h}(n+1) = \tilde{h}(n) - \frac{\mu_h}{2} \frac{\partial r^2(n)}{\partial \tilde{h}(n)}, \quad (1)$$

where $\mu_h$ is the step-size parameter which controls the adaptation speed, and $\partial r^2(n)/\partial \tilde{h}(n)$ denotes the gradient of the squared error signal $r^2(n)$ with respect to $\tilde{h}(n)$ and can be expressed as $$\frac{\partial r^2(n)}{\partial \tilde{h}(n)} = -2r(n)x(n), \quad (2)$$

where $r(n)=z(n)-\tilde{h}^T(n)x(n)$, and the resulting coefficient update equation is $$\tilde{h}(n+1)=\tilde{h}(n)+\mu_h r(n)x(n). \quad (3)$$

The microphone signal is given by $$z(n)=h^T F\{x_f(n)\}, \quad (4)$$

where the acoustic echo path is assumed to be time-invariant for the purpose of this analysis. The residual signal can be expressed in terms of the microphone and estimated linear echo, $$r(n)=z(n)-\tilde{h}^T(n)x(n). \quad (5)$$

Replacing $z(n)$ in $r(n)$ and expanding (3) yields $$\tilde{h}(n+1) = \tilde{h}(n) + \mu_h[h^T F\{x_f(n)\} - \tilde{h}^T(n)x(n)]x(n) \quad (6)$$

$$= \tilde{h}(n) + \mu_h[x(n)F\{x_f^T(n)\}h - x(n)x^T(n)\tilde{h}(n)].$$

Let $v(n)$ denote the weight error vector $h-\tilde{h}(n)$. Subtracting both sides of (6) from h yields $$h-\tilde{h}(n+1)=h-\tilde{h}(n)-\mu_h[x(n)F\{x_f(n)\}h-x(n)x^T(n)\tilde{h}(n)]. \quad (7)$$

Adding and subtracting $\mu_h x(n)x^T(n)h$ on the right hand side of (7) and collecting terms yields $$v(n+1)=[I-\mu_h x(n)x^T(n)]v(n)+\mu_h x(n)[x(n)-F\{x_f(n)\}]^T h. \quad (8)$$

In the following, it will be assumed that $x(n)$ is a white noise process with a zero mean and autocorrelation matrix $$R_{xx}=E\{x(n)x^T(n)\}=\sigma_x^2 I, \text{ where } \sigma_x^2=E\{x^2(n)\}$$

and I is the N-by-N identity matrix. Taking the expected value of both sides of (8), $$E\{v(n+1)\} = [I - \mu_h R_{xx}]E\{v(n)\} + \mu_h E\{x(n)[x(n) - F\{x_f(n)\}]^T\}h \quad (9)$$

$$= [1 - \mu_h \sigma_x^2]E\{v(n)\} + \mu_h Ah,$$

where $A=E\{x(n)[x(n)-F\{x_f(n)\}]^T\}$ and is also assumed to be a diagonal matrix. Further simplification yields:

$$E\{v(n+1)\}=[1-\mu_h\sigma_x^2]E\{v(n)\}+\mu_h\sigma_A^2 h. \quad (10)$$

Due to the assumption on $x(n)$, the above equation can be analyzed with respect to a single tap.

Let $v(n)=v_k(n)$ and $h=h_k$ for $1 \le k \le N$, i.e.

$$E\{v(n+1)\}=(1-\mu_h\sigma_x^2)E\{v(n)\}+\mu_h\sigma_A^2 h. \quad (11)$$

For time n+2, $$E\{v(n+2)\} = (1 - \mu_h\sigma_x^2)E\{v(n+1)\} + \mu_h\sigma_A^2 h \quad (12)$$

$$= (1 - \mu_h\sigma_x^2)^2 E\{v(n)\} + (1 + \mu_h\sigma_x^2)\mu_h\sigma_A^2 h + \mu_h\sigma_A^2 h.$$

In general then, for time n+m:

$$E\{v(n+m)\} = (1-\mu_h\sigma_x^2)^m E\{v(n)\} + (1-\mu_h\sigma_x^2)^{m-1}\mu_h\sigma_A^2 h + \ldots + \quad (13)$$

$$\mu_h\sigma_A^2 h$$

$$= (1-\mu_h\sigma_x^2)^m E\{v(n)\} + \mu_h\sigma_A^2 h \sum_{j=0}^{m-1}(1-\mu_h\sigma_x^2)^j.$$

Taking the limit as $m \to \infty$, $$\lim_{m \to \infty} E\{v(n+m)\} = \lim_{m \to \infty}(1-\mu_h\sigma_x^2)^m E\{v(n)\} + \quad (14)$$

$$\mu_h\sigma_A^2 h \lim_{m \to \infty}\sum_{j=0}^{m-1}(1-\mu_h\sigma_x^2)^j$$

$$= \frac{\mu_h\sigma_A^2 h}{1-(1-\mu_h\sigma_x^2)}$$

$$= \frac{\mu_h\sigma_A^2 h}{\mu_h\sigma_x^2}$$

$$= \frac{\sigma_A^2}{\sigma_x^2} h.$$

where it has been assumed that $0<\mu_h<2/\sigma_x^2$ and so $(1-\mu_h\sigma_x^2)^m \to 0$.

Using the result in (14), the steady-state value of $\tilde{h}(n)$ can be written as, $$\tilde{h}(\infty) = h - \frac{\sigma_A^2}{\sigma_x^2}h = \left(1 - \frac{\sigma_A^2}{\sigma_x^2}\right)h = \beta h. \quad (15)$$

Thus, this equation indicates the end result of the adaptation process and specifically indicates whether the system is converging or not.

Now suppose that the value of $\tilde{a}(n)=\tilde{a}$ is kept fixed from time n−1 onwards in the dynamic range processor 201 and let the resulting drive signal be denoted by $\tilde{x}_f(n)$ to reflect this. The second difference signal $r_f(n)$ is then $$r_f(n) = hF\{\tilde{x}_f(n)\} - \tilde{h}(n+1)x_f(n) \quad (16)$$

$$\approx hF\{\tilde{x}_f(n)\} - \beta h x_f(n),$$

where it has been assumed that $\tilde{h}(n+1)$ approximates $\tilde{h}(\infty)$. Computing the gradient of $r_f^2(n)$ with respect to $\tilde{a}(n)$, $$\frac{\partial r_f^2(n)}{\partial \tilde{a}(n)} = 2r_f(n)\frac{\partial r_f(n)}{\partial \tilde{a}(n)} \quad (17)$$

$$= -2r_f(n)\beta h\frac{\partial x_f(n)}{\tilde{a}(n)}$$

$$= -2r_f(n)\tilde{h}(n+1)u(n),$$

where $u(n)=\partial x_f(n)/\partial \tilde{a}(n)$ and depends on f. The resulting update equation for $\tilde{a}(n)$ in this case is therefore:

$$\tilde{a}(n+1) = \tilde{a}(n) - \frac{\mu_a}{2} \frac{\partial r_f^2(n)}{\partial \tilde{a}(n)} \quad (18)$$

$$= \tilde{a}(n) + \mu_a r_f(n)\tilde{h}(n+1)u(n).$$

Thus, this equation may define the update adaptation for the dynamic range adjustment parameters and thus the dynamic range adjustment processing of the dynamic range processor 201. It is noted that all of involved parameters can be calculated and that in particular u(n) can be determined from knowledge of the specific function which is used to generate the drive signal $x_f(n)$ from the input signal x(n).

In the following sections the gradient $\partial r_f^2(n)/\partial \tilde{a}(n)$ will be calculated for two different situations, namely for the situation where the loudspeaker 101 is operating in the linear domain and one for the situation where the dynamic range processor 201 has no effect, i.e. where the dynamic range adjustment parameters are set to such values that the dynamic range adjustment processing does not sufficiently restrict the dynamic range with respect to the linear operating range of the loudspeaker 101.

A general expression for the gradient is given by:

$$\frac{\partial r_f^2(n)}{\partial \tilde{a}(n)} = 2r_f(n)h\left(\frac{\partial F\{x_f(n)\}}{\partial \tilde{a}(n)} - \beta \frac{\partial x_f(n)}{\partial \tilde{a}(n)}\right). \quad (19)$$

First considering the scenario where the dynamic range processor 201 has no effect, i.e. where $F\{x_f(n)\} \approx F\{x(n)\}$
In this case, the term $\partial F\{x_f(n)\}/\partial \tilde{a}(n)$ is zero since $F\{x_f(n)\}$ is independent of $\tilde{a}(n)$. This results in a gradient:

$$\frac{\partial r_f^2(n)}{\partial \tilde{a}(n)} = -2r_f(n)\tilde{h}(n+1)u(n), \quad (20)$$

which is identical to the result in (17), and thus minimizes the squared error $r_f^2(n)$.

Now, considering the second scenario where the rendering path and specifically the power amplifier and audio transducer operate in the linear range. This may for example be the scenario where the dynamic range adjustment parameters f is a hard-clipper and the clipping level is set far below that of the audio amplifier's saturating input level.
In this case $F\{x_f(n)\} \approx x_f(n)$, and the gradient is given by $$\frac{\partial r_f^2(n)}{\partial \tilde{a}(n)} = 2r_f(n)h(1-\beta)u(n). \quad (21)$$

Because $0 \leq \beta \leq 1$, the gradient has an opposite direction to that in (17). Therefore, using the update in (18) will actually result in an increase of the error signal. Thus, in this situation the system will actually seek to increase the rendering non-linearity and thus will accordingly seek to increase the dynamic range.

Thus, using the update approach in (18) will in this situation result in an adaptation of the dynamic range adjustment processing that results in an increased error signal (i.e an increased signal level of the second difference signal $r_f(n)$). Hence, using the same update criterion will in the first scenario result in the value of the dynamic range adjustment parameters being adapted to reduce the error signal and thus increase the effect of the dynamic range adjustment processing. However, in the second scenario, the dynamic range adjustment parameters are adapted to increase the error signal, and thus to reduce the effect of the dynamic range adjustment processing.

For example, for a dynamic range adjustment processing comprising a hard limiter the system will seek to reduce the error signal level when the system operates with a high degree of rendering non-linearity and accordingly the clipping level will be increased. However, if the system is operating with the rendering in the linear region, the adaptation of the pre-processor 109 will actually seek to increase the error signal and will accordingly seek to increase the clipping value until $F\{x_f(n)\} \neq x_f(n)$, i.e. until the rendering is no longer operating in the linear range.

In more detail, assuming that the dynamic range adjustment parameters comprises only a single value indicating the threshold/clipping level:

$$f\{x(n); \tilde{a}(n)\} = \begin{cases} a, & x > a \\ x, & |x| \leq a \\ -a, & x < -a \end{cases} \quad (23)$$

where $x_f(n) = f\{x(n); \tilde{a}(n)\}, \quad (0 < \tilde{a}(n) \leq 1).$

The following relations hold, $$|x_f(n)| \leq |x(n)| \quad (24)$$

$$|f\{x(n); \tilde{a}_1(n)\}| \leq |f\{x(n); \tilde{a}_2(n)\}| \text{ for } \tilde{a}_1(n) \leq \tilde{a}_2(n). \quad (25)$$

Furthermore, let the physical nonlinearity (amplifier-loudspeaker) represented by the function F also be a hard-clipping function. The two situations in the previous sections translate to
1. $\tilde{a}(n) > a$.
2. $\tilde{a}(n) < a$.

In the first case, the update term of (18) can be expressed as:

$$r_f(n)\tilde{h}(n+1)u(n) = \beta h^2(F\{x_f(n)\} - \beta x_f(n))u(n). \quad (26)$$

Since $|x_f(n)| \geq |F\{x_f(n)\}|$ $0 \leq \beta \leq 1$, the update term will be negative as long as $|\beta x_f(n)| \geq |F\{x_f(n)\}|$
However, in the second case the update term is given by $$r_f(n)\tilde{h}(n+1)u(n) = h^2 \beta(1-\beta)x_f(n)u(n). \quad (27)$$

Since $\text{sgn}\{x_f(n)u(n)\} = 1$ and $0 \leq \beta \leq 1$, the update term is in this case positive.

It should be noted that the maximum dynamic range allowed by the dynamic range adjustment processing may be limited to prevent that u(n)=0 for all $x_f(n)$ since this would stall the update and tracking of the dynamic range processor parameters $\tilde{a}(n)$.

Thus, from each of the extreme situations, it can be seen that the system will converge towards a suitable clipping level.

As previously described, the dynamic range adjustment processing by the dynamic range processor 201 may in some embodiments be linear. However, in many embodiments and scenarios the dynamic range adjustment processing may advantageously be non-linear, and specifically may comprise a hard or soft signal clipping. The use of non-linear dynamic range adjustment processing may in many scenarios provide a lower complexity operation. Furthermore, it may typically provide a more advantageous trade-off between the different impacts on the rendered audio. For example, it may provide an improved trade-off between distortion and volume level when the power amplifier and/or audio transducer is driven in the non-linear range. Indeed, in such situations, the rendered audio may be distorted slightly and the volume level may be reduced slightly which is typically better than just reducing the volume level to a level where there is no distortion. Furthermore, due to the distortion being introduced by the pre-processor 109 (e.g. by clipping) with the power amplifier and audio transducer being operated substantially in the linear range, the echo canceller will still perform extremely well and will be able to reduce the echo to acceptable levels. Thus, in conventional systems, increased volume levels would result in non-linearities and distortions being introduced by the power amplifier/sound transducer which would result in poor echo cancellation. In contrast, the described approach may instead introduce non-linearity in the pre-processor 109 while allowing the power amplifier/audio transducer to operate in the linear range resulting in the echo cancellation still being efficient. Whereas the pre-processor 109 may introduce some distortion in this case, the distortion is typically no worse than what would be introduced by the rendering system and furthermore it ensures that the non-linearity/distortion does not affect the echo-cancellation. Thus, even when distortion occurs in the system, an efficient echo cancellation can still be achieved.

In some embodiments, the pre-processor 109 may comprise a variable gain which is arranged to scale the input signal x(n) prior to the application of the non-linear dynamic range adjustment parameters. The scaling of the input signal may in such embodiments be adapted based on a signal level measure of the input signal x(n) and on one or more of the dynamic range adjustment parameters.

Specifically, in some embodiments the dynamic range processor 201 may be arranged to perform a clipping of the input signal where the threshold for the clipping is determined by a clipping parameter of the dynamic range adjustment parameters. In such cases, the pre-processor 109 may be arranged to scale the input signal prior to the clipping. The scaling may be dependent on the current signal level (e.g. the peak or average amplitude level in a relatively short time interval, e.g. of around 20 msec to 300 msec) and on the current clipping level. For example, if the signal level is a little bit higher than the current clipping level, the gain may be kept close to unity resulting in a relatively small distortion and relatively high volume level. However, if the signal level is substantially higher than the clipping level, the variable gain may be reduced from unity. This may reduce the sound level but will also reduce the distortion. Thus, by adapting the variable gain, an improved trade-off between volume level and distortion of the rendered sound can be achieved.

In some embodiments, the variable gain is set so as to achieve a fixed level of clipping with respect to the measured average maximum peak level of the input signal and the current clipping level. Such a scaling of the input signal prior to dynamic range adjustment can also ensure that the update of the dynamic range adjustment parameters does not stall when u(n) is always zero.

An advantage of the system is furthermore that it does not require any specific knowledge of the characteristics of the rendering signal path. Specifically, it does not seek to model or estimate the rendering signal path but instead seeks to control the drive signal $x_f(n)$ such that the rendering is more linear. This is automatically achieved without knowledge or assumptions about the specific non-linear behavior of e.g. the power amplifier or audio transducer. Accordingly, the pre-processor 109 may be used with any rendering equipment and indeed may be added to existing rendering systems.

A particular advantage of the system is that the pre-processor 109 may be independent of the echo cancellation of the signal being communicated to the far end. Indeed, in the example of FIG. 1, the pre-processor 109 is independent of the echo canceller 105 and vice versa in that no internal signals of the pre-processor 109 are used by the echo canceller 105 and no signals of the echo canceller 105 are used by the pre-processor 109.

Specifically, the echo canceller 105 performs the echo cancellation based only on the drive signal for the loudspeaker 101. It does not use any of the internal or input signals of the pre-processor 109 and specifically does not use the input signal x(n), the first compensated signal or the second compensated signal. Nor does the echo canceller 105 need to take into account the pre-processor 109 but indeed the echo canceller 105 may use a conventional linear echo cancellation approach. Thus, an advantage of the system is that it may provide an improved echo cancellation approach by the combination and synergy between the pre-processor 109 and echo canceller 105 while allowing both to be designed independently.

It will also be appreciated that the system with pre-processor 109 may be used with a multi-microphone system where the inputs to the pre-processor 109 comprise the input signal x(n) and one of the microphone signals from the multi-microphone system. This microphone may e.g. be selected based on the maximum coupling with the loudspeaker 101.

Indeed, a significant advantage of the approach is that the pre-processor 109 may be introduced to existing (linear) echo cancellation systems to provide improved echo cancellation.

In the following experimental results for a specific implementation will be described.

In the example, two main functions are used to model the physical system $F\{x_f(n)\}$:

1. A hard-clipping to model the saturation characteristics of an audio amplifier:

$$F_1\{x_f(n); a\} = \begin{cases} a, & x_f(n) > a \\ x_f(n), & |x_f(n)| \le a \\ -a, & x_f(n) < -a \end{cases}$$

where the value of a is set to 0.25.

2. A power filter model of loudspeaker nonlinearity:

$$F_2\{x_f(n)\} = x_f(n) - 0.13x_f^2(n) - 0.35x_f^3(n) + 0.05x_f^4(n).$$

Figure 7:
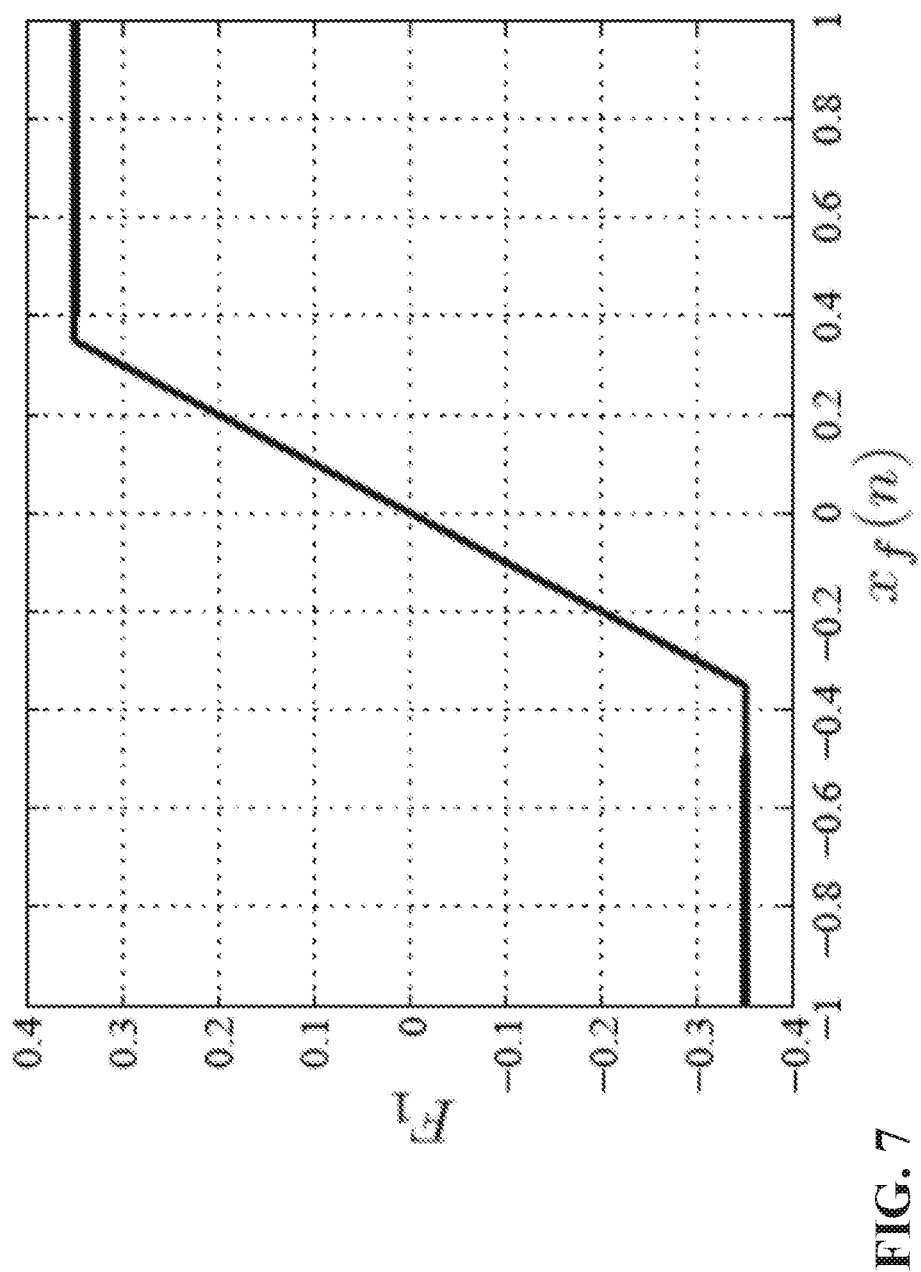
FIGS. 7 and 8 illustrate examples of non-linearities for elements of an audio rendering path.
Figure 8:
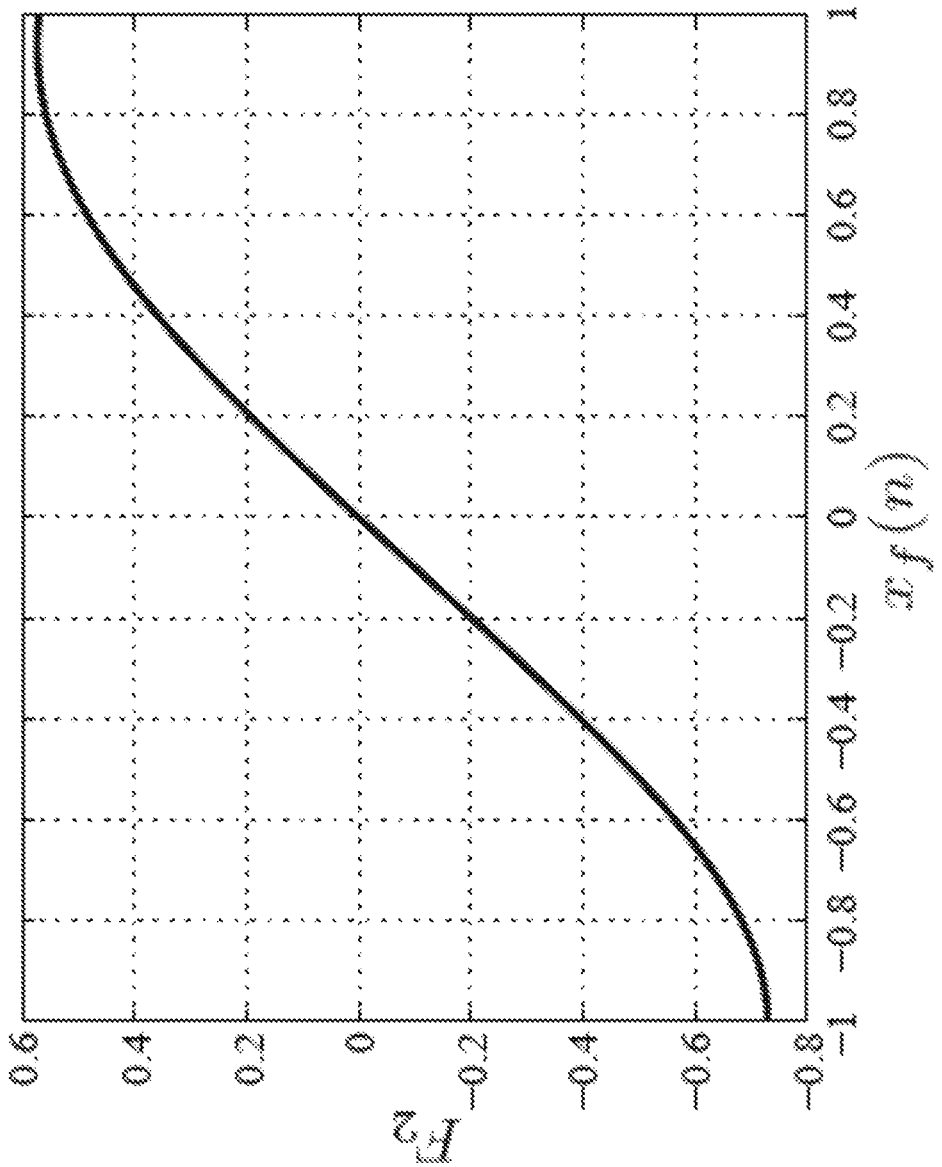

The functions are illustrated in FIGS. 7 and 8.

Figure 9:
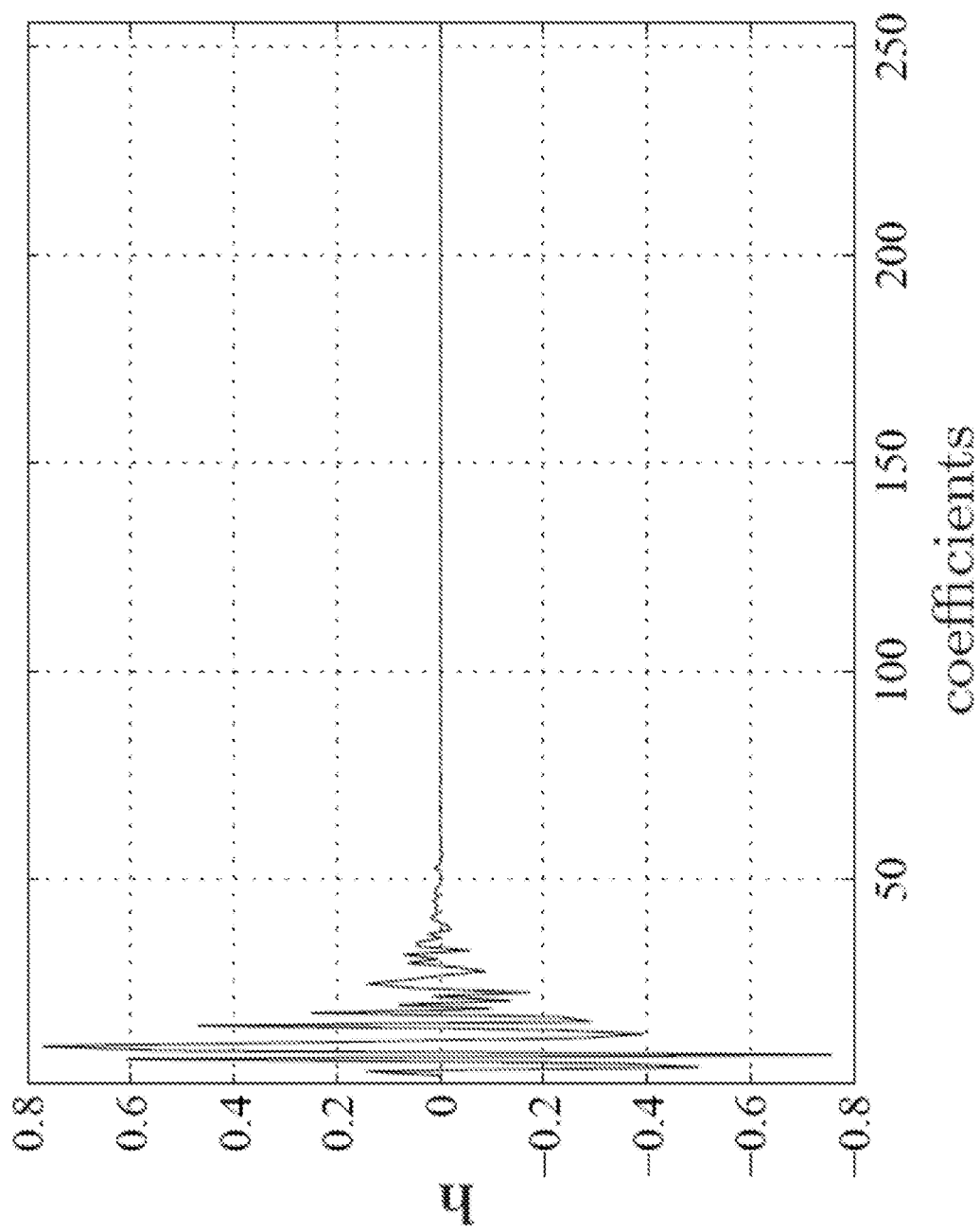
FIG. 9 illustrates an example of an acoustic impulse response for an acoustic echo.

The function f is restricted to a hard-clipping function with an adaptive threshold, since this type of function is efficient and simple to implement. Furthermore, and as will be shown, it can be used to easily deal with both physical systems F1 and F2. The linear acoustic echo path h is assumed to be stationary and shown in FIG. 9.

An artificial male speech signal of approximately 11 seconds in length and sampled at 16 kHz is used as the input signal x(n). The dynamic range is −0.73 to 0.5, where +1 and −1 represent the maximum and minimum amplitude, respectively. The signal is repeated a number of times to observe the steady-state performance of the evaluated systems.

An adaptive filter with 80 taps and employing the NLMS algorithm is used to model the direct path of the acoustic impulse response h, with the initial value of $\tilde{h}(n)$ set to zero. In the case of $\tilde{h}(n+1)$, the update term is normalized by a smoothed power-estimate of $x(n)$, while in the case of updating $\tilde{a}(n)$ the normalization is performed using the value $\tilde{h}^T(n)\tilde{h}(n)$. The step-size values are $\mu_h=0.01$ and $\mu_a=0.01$, respectively. The initial value of $\tilde{a}(n)$ is set to 0.1. A lower and upper bound of 0.1, and 0.95 for the value of $\tilde{a}(n)$ is enforced after each update. The upper bound of 0.95 may be used to ensure that the update of $\tilde{a}(n)$ does not stall for higher values when $u(n)$ may remain zero.

The echo cancellation is evaluated for an echo canceller employing a simple adaptive filter of length 128 taps. The performance measure used is the power spectral density (PSD) of the residual echo signal.

Figure 10:
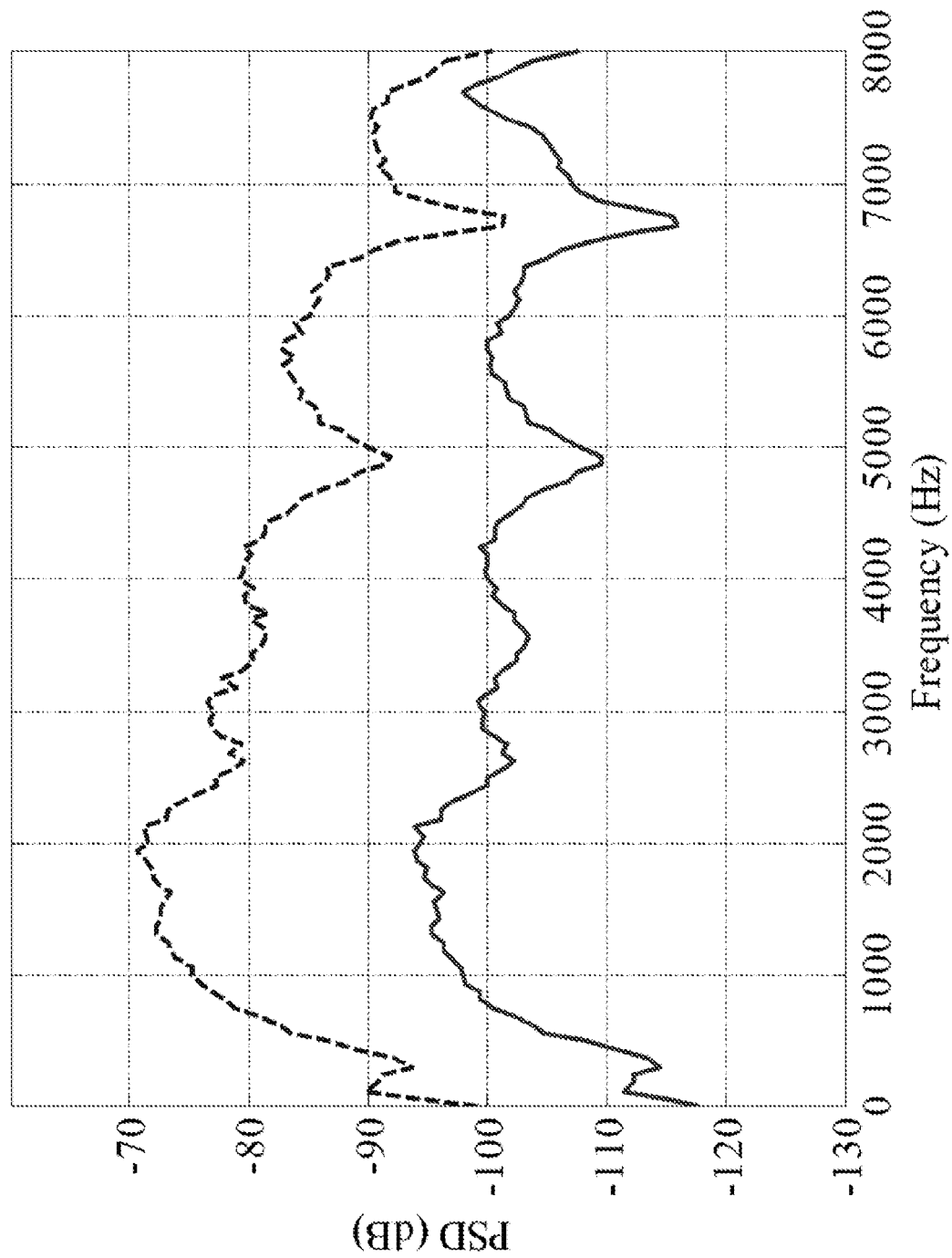
FIGS. 10 and 11 illustrate examples of PSDs for error signals in the audio apparatus of FIG. 1 or 2.
Figure 11:
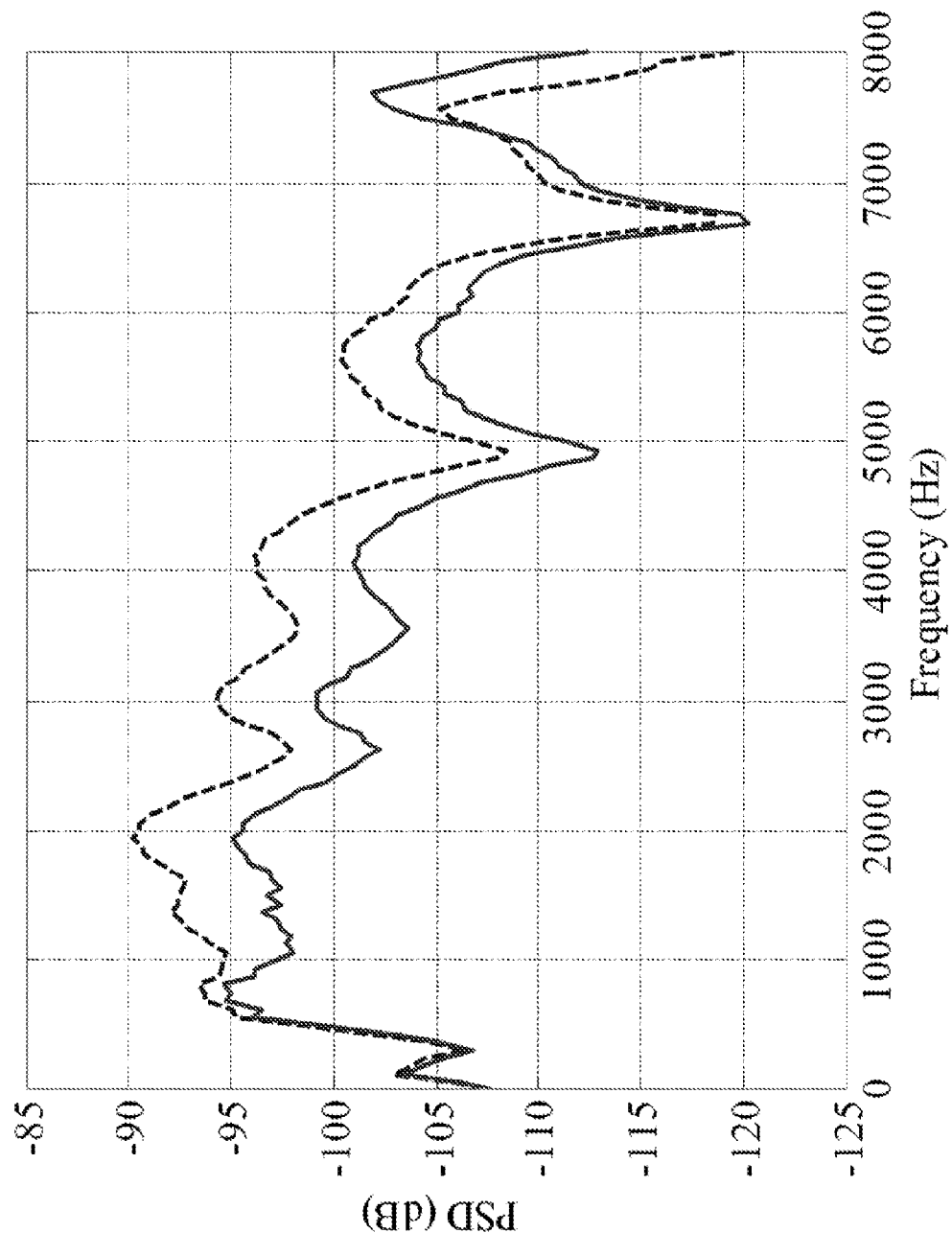

FIG. 10 illustrates the results for the first model $F_1$, i.e. for power amplifier clipping and FIG. 11 illustrates the results for the second model $F_2$, i.e. for loudspeaker nonlinearity. The dashed line illustrates the PSD of the error signal without the presence of the pre-processor 109 and the solid line illustrates the PSD of the error signal with the presence of the pre-processor 109.

As can be seen, a substantial performance improvement is achieved in both situations. Thus, as demonstrated by the experiments, a preprocessor using a hard-clipping function can provide a low-cost approach to reduce the amount of nonlinear distortion produced by the loudspeaker, thereby improving the acoustic echo cancellation performance. A further advantage of the proposed approach is that it is independent of the physical nonlinear model as shown by the performance improvement for two different models of nonlinearity (clipping and power filter models). Indeed, in many embodiments, an improvement in echo cancellation performance of more than 5-20 dB can often be achieved.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. An audio apparatus comprising:
a first circuit for applying a dynamic range adjustment processing to an input signal to generate an output signal for rendering by a loudspeaker, the dynamic range adjustment processing being dependent on a set of dynamic range adjustment parameters;
a first linear echo-cancellation filter for generating a first compensated signal from the input signal;
a first adapter for determining a set of filter parameters for the first linear echo-cancellation filter in response to the first compensated signal and a microphone signal;
a second circuit for generating a second compensated signal by applying the dynamic range adjustment processing and a second echo-cancellation filter to the input signal, the second echo-cancellation filter corresponding to the first echo-cancellation filter;
a second adapter for determining the set of dynamic range adjustment parameters in response to the second compensated signal and the microphone signal.

2. The audio apparatus of claim 1, wherein the dynamic range adjustment processing is a non-linear dynamic range adjustment processing.

3. The audio apparatus of claim 2, further comprising a variable gain arranged to scale the input signal in response to a signal level measure of the input signal and at least one parameter of the set of dynamic range adjustment parameters.

4. The audio apparatus of claim 3, wherein the at least one parameter is a clipping level parameter.

5. The audio apparatus of claim 2, wherein the non-linear dynamic range adjustment processing comprises signal clipping.

6. The audio apparatus of claim 5, wherein the signal clipping is a hard clipping.

7. The audio apparatus of claim 1, further comprising an echo canceller arranged to perform echo cancellation on the microphone signal based on the output signal.

8. The audio apparatus of claim 7, wherein the echo canceller is a linear echo-canceller.

9. The audio apparatus of claim 7, wherein the echo canceller is independent of the first compensated signal, the second compensated signal and the input signal.

10. The audio apparatus of claim 1, wherein the first adapter is arranged to generate a difference signal between the first compensated signal and the microphone signal, and to modify the set of filter parameters to reduce the difference signal.

11. The audio apparatus of claim 1, wherein the second adapter is arranged to generate a difference signal between the second compensated signal and the microphone signal, and to modify the set of dynamic range adjustment parameters to reduce the difference signal.

12. The audio apparatus of claim 1, wherein the dynamic range adjustment parameters define a function relating values of the input signal to values of the output signal.

13. An audio processing method comprising acts of:
applying a dynamic range adjustment processing to an input signal by a first circuit to generate an output signal for rendering by a loudspeaker, the non-linear processing being dependent on a set of dynamic range adjustment parameters;
generating a first compensated signal from the input signal by a first linear echo-cancellation filter;
determining by a first adaptor a set of filter parameters for the first linear echo-cancellation filter in response to the first compensated signal and a microphone signal;
generating a second compensated signal by a second circuit by applying the dynamic range adjustment processing and a second echo-cancellation filter to the input signal, the second echo-cancellation filter corresponding to the first echo-cancellation filter; and
determining the set of dynamic range adjustment parameters by a second adapter in response to the second compensated signal and the microphone signal.

14. A tangible computer program product that is not a transitory propagating wave or signal comprising computer program code that when run on a processor, configures the processor to perform an audio processing method, the method comprising acts of:
in an audio apparatus:
applying a dynamic range adjustment processing by a first circuit to an input signal to generate an output signal for rendering by a loudspeaker, the non-linear processing being dependent on a set of dynamic range adjustment parameters;
generating a first compensated signal from the input signal by a first linear echo-cancellation filter;
determining a set of filter parameters for the first linear echo-cancellation filter in response to the first compensated signal and a microphone signal;
generating a second compensated signal by a second circuit by applying the dynamic range adjustment processing and a second echo-cancellation filter to the input signal, the second echo-cancellation filter corresponding to the first echo-cancellation filter; and
determining the set of dynamic range adjustment parameters in response to the second compensated signal and the microphone signal.

15. The audio apparatus of claim 1, wherein the first circuit is a different circuit than the second circuit.

* * * * *